United States Patent Office 2,712,351
Patented July 5, 1955

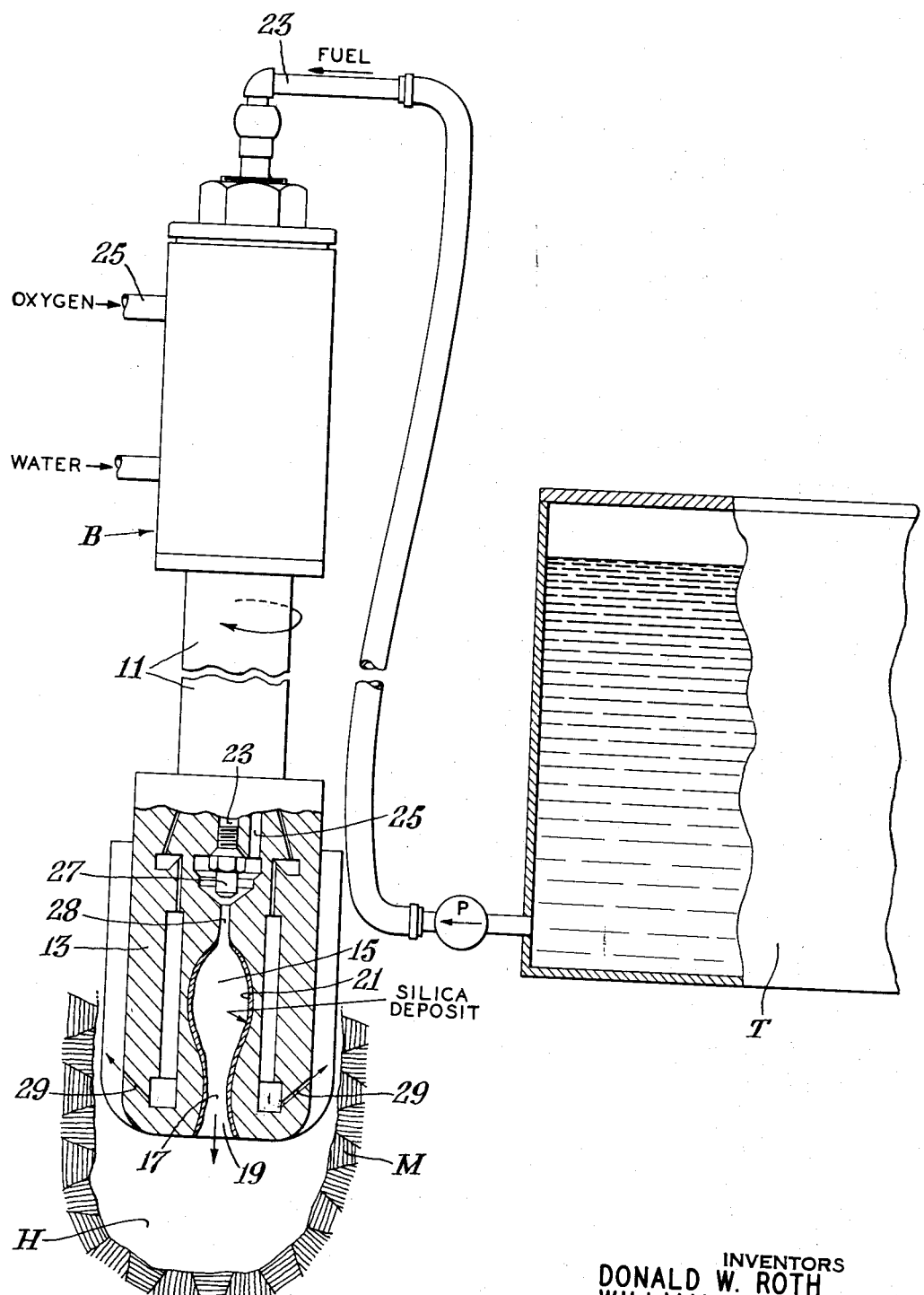

2,712,351

METHOD OF OPERATING AN INTERNAL COMBUSTION BLOWTORCH

Donald W. Roth and William J. Mitchell, Kenmore, N. Y., assignors, by mesne assignments, to Union Carbide and Carbon Corporation, a corporation of New York Application February 23, 1949, Serial No. 77,772

5 Claims. (Cl. 158—27.4)

This invention relates to a novel method for operating a blowtorch of the internal combustion type.

There has recently been developed a blowtorch for piercing deep blasting holes in mineral materials, such as dolomite and taconite iron ore, wherein a fuel burns in a combustion chamber within a nozzle and heating of the mineral is accomplished by the combustion gases which are discharged from the combustion chamber at supersonic velocity through an expanding orifice. Such blowtorches have been very successful in piercing deep holes rapidly and economically, but it has been found that each nozzle can be expected to pierce only about 150 feet of hole before the metal wall of the internal combustion chamber burns out due to erosion and oxidation.

An object of the present invention is to provide a novel method for operating an internal combustion blowtorch so as to provide improved resistance to burn-out. Still another object is to increase the length of hole which can be pierced in mineral material by such a blowtorch before burn-out of the nozzle occurs.

The single figure of the drawing is a schematic side elevational view, partly broken away and in section, of a mineral piercing blowtorch together with auxiliary equipment, shown in position for piercing a hole vertically downward in a mass of mineral material.

In accordance with the present invention there is provided a novel blowtorch B comprising an elongated tubular body 11 carrying on its lower end a water-cooled nozzle 13 of metal having high heat conductivity and good heat resistance, such as copper. Nozzle B has an internal combustion chamber 15, which includes a throat 17 and an expanding orifice 19 for discharging hot combustion gases therefrom. The metallic internal wall of combustion chamber 15 is provided with a coating or deposit 21 of fused silica which adheres thereto and protects the wall from oxidation and erosion.

A fuel such as kerosene or diesel oil is pumped from a tank T to chamber 15 through a supply conduit 23 which enters the top of the blowtorch B and extends down through body 11 to the nozzle 13 where it is discharged from an injector 27 through a restricted entrance 28 into chamber 15. An oxidant, such as liquid or gaseous oxygen, air, ozone, or peroxides, is supplied to the chamber 15 from a suitable source by a conduit 25 which enters near the top of the blowtorch and extends down through body 11 to the nozzle 13. The fuel and oxygen mix intimately together during their passage to the chamber 15 and burn therein with an intense heat. The burning combustion gases are discharged through throat 17 and expanding orifice 19, and leave the nozzle 13 at supersonic velocity to heat the portions of a mineral body M adjacent the front of the nozzle and form a hole H.

The ejection of detritus from hole H is accomplished by the gaseous combustion products and by steam formed by the evaporation of cooling water jets discharged from nozzle 13 through a plurality of circumferentially arranged ports 29.

It has been found that when a coating 21 of silica is deposited on the wall of the combustion chamber 15 before operation of the blowtorch, it disappears fairly rapidly during the operation of the blowtorch. However, such a protective coating can be deposited and continuously maintained throughout an operating period of a blowtorch by carrying into the combustion chamber along with the liquid fuel a minor quantity of a compound of silicon which, upon combustion of the fuel, is continuously deposited as silica on the wall of the chamber 15. Among the compounds of silicon which can be used successfully are powdered silica suspended in a liquid fuel. Others are monomeric tetra ethyl and tetra methyl orthosilicates, silicon tetra chloride, silane, trichlorosilane, dichlorosilane, ethyltriethoxysilane, triethoxysilane, methyl and ethyl silicone liquids, and the poly esters formed as residues in the esterification of ethyl and amyl trichlorosilane, all of which can be dissolved in a liquid fuel such as kerosene or diesel oil.

Successful operation has been achieved when the compound of silicon is present in the liquid fuel in an amount equivalent to between 0.01% and 10% of silica by weight. In some instances it is desirable to introduce silicon compound at a relatively great rate initially, to build up the initial layer of silica on the metallic wall of chamber 15, and then to reduce the rate of introduction to the smaller value required only to maintain the thickness of the coating. For example, the concentration of silicon compound in the fuel can initially be maintained at some value equivalent to at least 0.25% of silica, and after the coating of silica has been built up to the desired thickness the concentration can be reduced to and maintained at a lower value equivalent to not less than 0.01% of silica.

A series of experiments has shown that a silica layer can be successfully deposited and maintained in a rock piercing blowtorch by following the method described above.

Example 1

In one experiment a blowtorch similar to the one shown in the drawing was operated using 3,000 cubic feet per hour of oxygen and 72 pounds per hour of kerosene in which 2% by weight of tetra ethyl orthosilicate was dissolved (equivalent to 0.58% $SiO_2$), and a substantial silica coating was deposited.

Example 2

In a second test using the same concentration of tetra ethyl orthosilicate in the kerosene as in Example 1, oxygen was supplied at a rate of 2500 cubic feet per hour and kerosene at a rate of 59 pounds per hour. An equilibrium silica coating thickness was reached after about 4 minutes of operation, and was maintained for the whole period of operation.

Example 3

Under conditions similar to those of Example 2, 1% by weight of tetra ethyl orthosilicate (equivalent to 0.29% $SiO_2$) in the kerosene caused an equilibrium coating thickness to be reached after 17 minutes of operation, and the coating was maintained for the whole period of operation.

Examples 4 and 5

Under the same conditions as in Example 2, a silica coating was also built up and maintained successfully on the wall of combustion chamber 15 throughout a 20-minute run when only 0.5% of tetra ethyl orthosilicate (equivalent to 0.145% $SiO_2$) was dissolved in the kerosene; and 0.25% tetra ethyl orthosilicate (equivalent to 0.073% $SiO_2$) in the kerosene built up and maintained a silica coating throughout a 25-minute run.

Example 6

In another test silicon tetrachloride was dissolved in kerosene, and when the solution was burned with oxygen in chamber 15, silica was deposited on the wall of the chamber.

*Examples 7 and 8*

Tests using powdered silica suspended in the fuel were also successful. 10% by weight of silica powder in dry kerosene was burned in an internal combustion burner with 8,000 cubic feet per hour of oxygen at a 3.5 oxygen-fuel ratio, and deposits of silica were found on the wall of the combustion chamber. Also 2% by weight of powdered diatomaceous earth, which is mainly silica, was suspended in kerosene and upon combustion of the mixture in the chamber 15 a coating of silica was formed.

*Examples 9, 10 and 11*

The method and apparatus of the invention have been used successfully in field tests for piercing deep blasting holes in dolomite. In one series of tests a rotating internal combustion blowtorch, similar to that shown in the drawing but having two flame discharge orifices from the combustion chamber 15, was used to pierce 140 feet of blasting holes 6 inches in diameter, using 3% by weight of tetra ethyl orthosilicate (equivalent to 0.87% $SiO_2$) in kerosene as the fuel, with no noticeable erosion of the combustion chamber wall. Using 2% by weight of tetra ethyl orthosilicate in kerosene, 235 feet of holes 6 inches in diameter were pierced successfully without noticeable erosion of the combustion chamber wall. In both of these sets of tests oxygen was used at rates between 6,600 and 7,800 cubic feet per hour and fuel-oxygen ratios were varied from 2.8 to 3.5. Another successful dolomite piercing test was made using 2% by weight of tetra ethyl orthosilicate dissolved in diesel fuel oil.

While specific embodiments of the invention have been described in detail above by way of illustration, it is to be understood that changes in the blowtorch and in the method of operation can be made without departing from the principles of the invention.

What is claimed is:

1. A method of operating a heating blowtorch having a metallic internal combustion chamber having a restricted outlet portion communicating with an expanding orifice for discharging a high temperature flame jet of high velocity therefrom which comprises concurrently and continuously feeding to said chamber oxygen and a liquid fuel carrying between 0.01% and 10% by weight of silica therewith; effecting combustion in said chamber at fuel and oxygen feed rates and pressures to provide flame temperatures higher than the fusion temperature of silica and to provide a flame that is continuously discharged from said chamber at high velocity whereby a protective coating of a fused silica is deposited on the internal walls of said chamber and excess coating is washed out of said chamber; and reducing the amount of said silica in said fuel to not less than 0.01% of silica by weight to balance the rate of deposition of fused silica to the rate at which it is washed out of said chamber for maintaining a desired equilibrium thickness of fused silica on said chamber walls.

2. A method of operating a heating blowtorch having a metallic internal combustion chamber having a restricted outlet portion communicating with an expanding orifice for discharging a high temperature flame jet of high velocity therefrom which comprises concurrently and continuously feeding to said chamber oxygen and a liquid fuel carrying along therewith a quantity of a compound of silicon combustible to form between 0.01% and 10% by weight of silica; effecting combustion in said chamber at fuel and oxygen feed rates and pressures to provide flame temperatures higher than the fusion temperature of silica and to provide a flame that is continuously discharged from said chamber at high velocity whereby a protective coating of fused silica is deposited on the internal walls of said chamber and excess coating is washed out of said chamber; and reducing the amount of said compound of silicon in said fuel to a quantity not less than the equivalent of 0.01% by weight of silica to balance the rate of deposition of fused silica to the rate at which it is washed out of said chamber for maintaining a desired equilibrium thickness of fused silica on said chamber walls.

3. A method in accordance with claim 2 wherein said compound is tetra ethyl orthosilicate.

4. A method in accordance with claim 2 wherein said compound is silicon tetrachloride.

5. A method in accordance with claim 2 wherein said compound is initially maintained at a concentration equivalent to at least 0.25% of silica to build up said coating, and is subsequently reduced to and maintained at a lower concentration equivalent to not less than 0.01% of silica.

References Cited in the file of this patent

UNITED STATES PATENTS

| | | |
|---|---|---|
| 1,112,234 | Stuart | Sept. 29, 1914 |
| 1,167,135 | Torsen | Jan. 4, 1916 |
| 1,204,211 | Tone | Nov. 7, 1916 |
| 1,540,676 | Bagley | June 2, 1925 |
| 1,689,551 | Hammond | Oct. 30, 1928 |
| 1,693,880 | Wetmore | Dec. 4, 1928 |
| 1,702,642 | Caldwell | Feb. 19, 1929 |
| 1,981,766 | Winckler | Nov. 20, 1934 |
| 2,367,119 | Hess | Jan. 9, 1945 |
| 2,432,109 | Zisman | Dec. 9, 1947 |

FOREIGN PATENTS

| | | |
|---|---|---|
| 353 | Australia | Jan. 30, 1926 |
| 445,506 | Great Britain | Apr. 4, 1936 |